United States Patent [19]
Rank et al.

[11] Patent Number: 5,613,571
[45] Date of Patent: Mar. 25, 1997

[54] ROTATIONAL SPEED/TIP SENSOR

[75] Inventors: David B. Rank, Waukesha, Wis.; Mark L. Clymer, Mystic; Glenn Graves, Oakdale, both of Conn.

[73] Assignee: Harley-Davidson, Inc., Milwaukee, Wis.

[21] Appl. No.: 534,102

[22] Filed: Sep. 26, 1995

[51] Int. Cl.$^6$ ................................................. B60K 28/14
[52] U.S. Cl. .................. 180/282; 180/283; 180/219; 340/440; 340/689; 324/207.2; 33/366
[58] Field of Search ................. 180/282, 283, 180/284, 219; 33/366, 370; 340/440, 429, 689; 324/207.2, 174; 200/61.52

[56] References Cited

U.S. PATENT DOCUMENTS

| | | | |
|---|---|---|---|
| 1,837,533 | 12/1931 | Colvin | 200/61.52 |
| 4,221,278 | 9/1980 | Ponzo | 180/283 |
| 4,803,426 | 2/1989 | Odagawa et al. | 324/207.2 |
| 4,917,209 | 4/1990 | Horiike et al. | 180/219 |
| 4,972,595 | 11/1990 | Shimamura et al. | 33/366 |
| 5,014,005 | 5/1991 | Murata et al. | 324/207.2 |
| 5,028,868 | 7/1991 | Murata et al. | 324/207.2 |
| 5,042,158 | 8/1991 | Schmelzer | 33/366 |
| 5,138,258 | 8/1992 | Murata | 324/207.2 |

*Primary Examiner*—Brian L. Johnson
*Assistant Examiner*—Peter C. English
*Attorney, Agent, or Firm*—Donald Cayen

[57] ABSTRACT

A rotational speed/tip sensor combines a tip sensor and a speed sensor in one compact package for use on a motorcycle. The tip sensor includes a disk and a sensing device that detects the absence or presence of the disk in the apex of a V-groove. If the motorcycle tips over, the disk rolls out of the V-groove apex and actuates the tip sensing device to open a circuit through a speed sensing device and thereby shut down the motorcycle engine. The tip and speed sensors are assembled to a housing that is mounted to the engine. Only three wires are used to connect both the tip sensing device and the speed sensing device to the engine control.

18 Claims, 4 Drawing Sheets

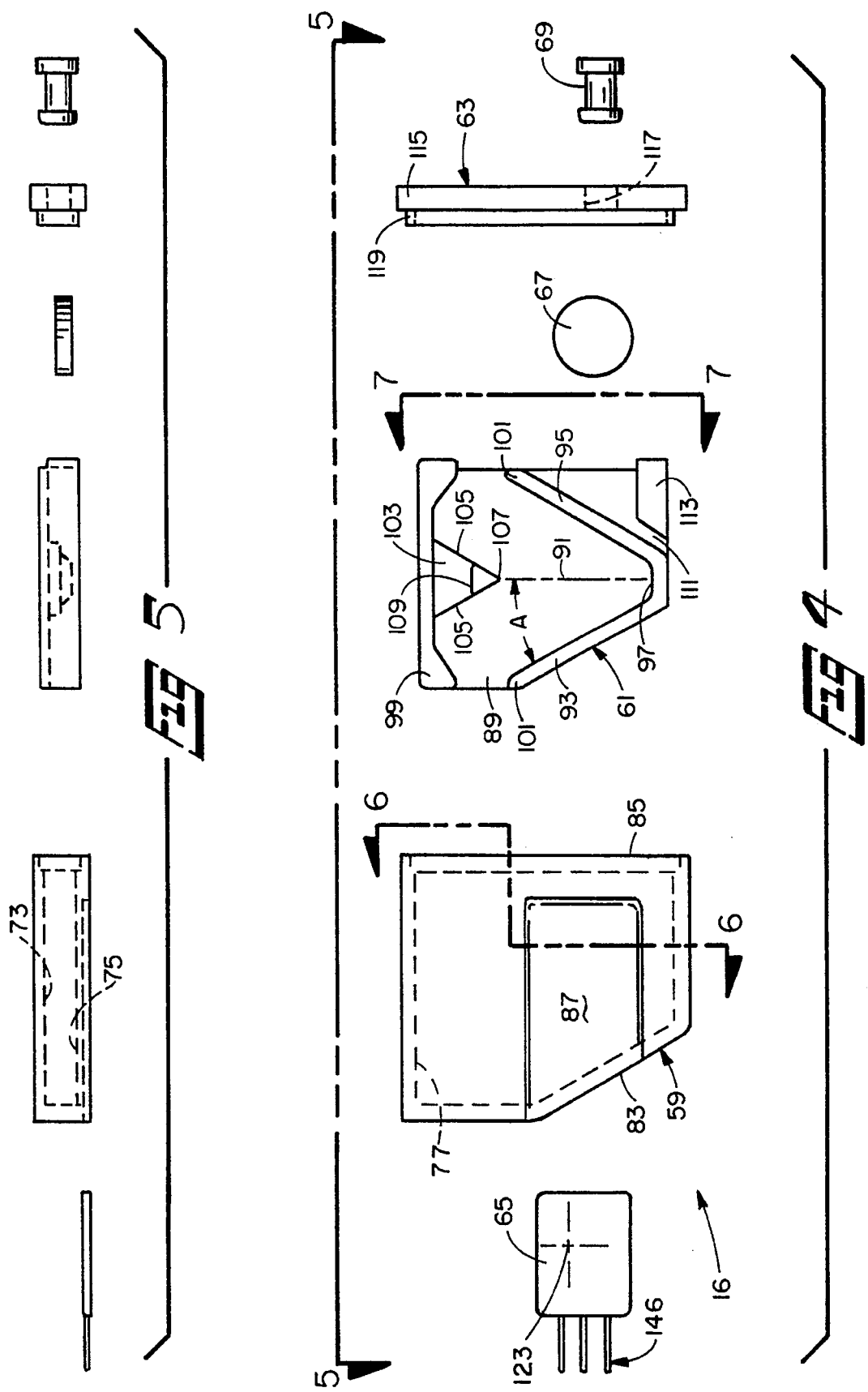

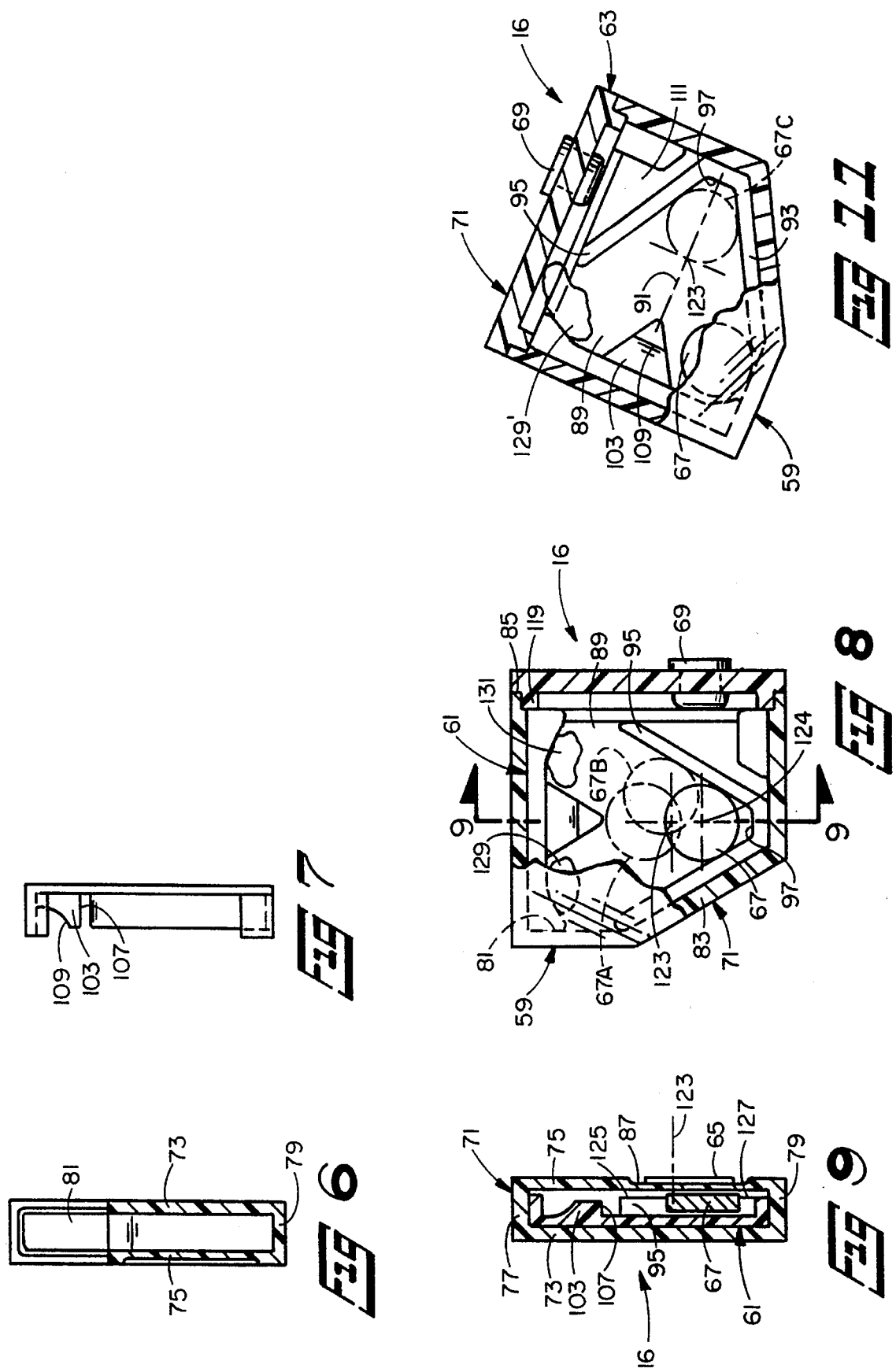

ROTATIONAL SPEED/TIP SENSOR

BACKGROUND OF THE INVENTION

1. Field of the Invention

This invention pertains to two-wheeled motor vehicles, and more particularly to apparatus and methods for controlling the engine of a motorcycle.

2. Description of the Prior Art

The design of powered two-wheeled vehicles such as motorcycles is a difficult task. On one hand, the motorcycles must include numerous performance related features that appeal to purchasers. On the other hand, the space available for such components is very limited. In addition, the weight of the various components must be kept to a minimum.

A desirable motorcycle feature is a tip sensor that detects whether the motorcycle is in an upright attitude or whether it has tipped over. A prior tip sensor employed a pendulum that swung in a housing. The pendulum contained two spaced apart magnets. If the housing tilted sufficiently, one of the magnets approached an associated sensing devise and caused it to actuate an appropriate electrical circuit.

Another prior inclination sensor included a metal sleeve that was slideable along an arcuate beam. As the beam tilted in space, the sleeve approached one of the beam ends, where it made electrical contact with an appropriate circuit.

The pendulum and slideable sleeve sensors were complicated and bulky. In addition, their reliability was suspect.

U.S. Pat. No. 4,972,595 shows an inclination sensor that mounts to a circuit board of a motorcycle. Although of relatively simple and compact design, the sensor of the U.S. Pat. No. 4,972,595 patent did not find widespread commercial acceptance.

Thus, a need exists for improvements in inclination sensors for motorcycle use.

SUMMARY OF THE INVENTION

In accordance with the present invention, a rotational speed/tip sensor is provided that controls the engine of a powered two-wheeled vehicle. This is accomplished by apparatus that includes a tip sensor and an engine speed sensor that are combined into a single compact package.

The tip sensor is comprised of a disk that rolls in a two dimensional straight sided V-groove. The V-groove is partially bounded by two straight ramp walls joined to a side wall. The plane of the side wall is perpendicular to the planes of the ramp walls. The ramp walls converge at a predetermined angle to form the apex of the V-groove. The ramp and side walls are components of a V-block that further includes a top wall. The V-block top wall extends perpendicularly from the side wall and is spaced from free ends of the ramp walls opposite the V-groove apex.

Depending from the top wall of the V-block directly over the V-groove apex is a bumper. The bumper has two surfaces that are parallel to respective ramp walls and that are spaced from them a distance slightly greater than the diameter of the disk. The surfaces of the bumper converge to a point. The bumper prevents the disk from moving from one ramp wall to the other within the V-groove without first passing close to the apex. There is a cutout in the bumper near the V-block top wall.

The V-block is assembled in a case such that the V-block side wall is proximate a back wall of the case. A front wall of the case is spaced from the longitudinal edges of the V-block ramp walls and is also spaced from the bumper. The case is closed with a cap and may be partially filled with a damping fluid. A quantity of air in the form of an air bubble remains within the case.

A sensing device, such as a Hall Effect sensing device, is located outside and adjacent the front wall of the case. The sensing device is located such that its target point intersects the disk for all positions of the disk between the V-groove apex and the bumper point. The sensing device is part of an electrical circuit that functions in accordance with the state of the sensing device.

The speed sensor is comprised of a gear cup that rotates with the vehicle engine. The gear cup has a tubular wall with at least one cutout therein. A magnet is located on one side of the gear cup wall, and a sensing device is on the other side of the wall. The magnet and sensing device cooperate to sense the cutout in the gear cup, thus giving an indication of the engine speed.

The tip sensor and the speed sensor are assembled into a common housing. The housing is formed with a first chamber that holds the tip sensor and a second chamber that holds the speed sensor. The housing is mounted to a plate that in turn is attached to the vehicle engine. The entire rotational speed/tip sensor assembly occupies a minimum of space.

It is a feature of the present invention that the housing second chamber also contains a printed circuit board to which the electrical wires of the tip sensor sensing device and the speed sensor sensing device are connected. The tip sensor and speed sensor sensing devices are connected electrically in series using a single set of wires for the power supply, signal, and ground wires.

In operation, the rotational speed/tip sensor is attached to the vehicle engine such that the V-groove apex of the tip sensor points downwardly when the vehicle is in an upright attitude. The tip sensor sensing device operates to detect the presence of the disk within the V-groove apex and to produce an appropriate signal to the engine control circuit. As long as the vehicle does not tip about a horizontal axis by an amount such that one of the V-block ramp walls becomes horizontal, the disk remains in the V-groove apex. The tip sensor sensing device continues to detect the presence of the disk and control the electrical circuit accordingly.

However, if the vehicle tips an amount that places a tip sensor ramp wall horizontal, the disk will roll along that ramp wall away from the V-groove apex. The absence of the disk is detected by the tip sensor sensing device, which actuates to interrupt the signal to the speed sensor sensing device. In that situation, the engine control module causes an event, such as stopping the engine spark, to occur. When the vehicle is returned to its upright attitude, the disk rolls back to the V-groove apex, where its presence is again detected by the tip sensor sensing device. A signal is then available to the speed sensor sensing device, so the vehicle engine can be restarted.

The fluid within the tip sensor case damps undesirable bouncing of the disk within the V-groove due to spurious vibrations acting on the vehicle. On the other hand, when the vehicle is tipped, the fluid flows readily through a labyrinth composed of the cutout in the V-block bumper and of the space between the V-block ramp walls and bumpers and the case front wall. The air within the case creates a flushing action of the fluid as it flows in response to tipping of the vehicle. The combination of the labyrinth and the air induced flushing action of the fluid flowing through the labyrinth enables responsive rolling of the disk when the vehicle tips, even though the fluid damps unwanted disk movement due to vibrations.

The method and apparatus of the invention, combining a tip sensor and a speed sensor in a single package, thus provides two-wheeled motor vehicles with a very compact and reliable component. The tip sensor interrupts the signal to the speed sensor to shut down the vehicle when the vehicle tips over, even though the tip sensor is not affected by normal road vibrations.

Other advantages, benefits, and features of the present invention will become apparent to those skilled in the art upon reading the detailed description of the invention.

BRIEF DESCRIPTION OF THE DRAWINGS

FIG. 4 is an exploded view of the tip sensor of the invention.

FIG. 5 is a view taken along line 5—5 of FIG. 4.

FIG. 6 is a cross sectional view taken along line 6—6 of FIG. 4.

FIG. 7 is a view taken along line 7—7 of FIG. 4.

FIG. 8 is a partially broken front view of the tip sensor in its assembled condition.

FIG. 9 is a cross sectional view taken along line 9—9 of FIG. 8.

FIG. 11 is a view similar to FIG. 8, but showing the tip sensor in a tipped attitude.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

GENERAL

Figure 1:
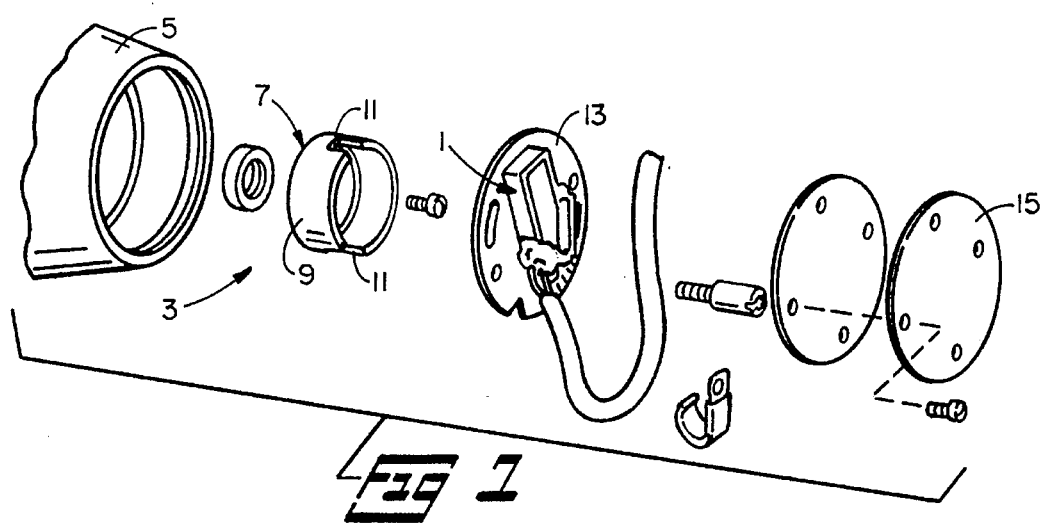
FIG. 1 is an exploded view of a portion of a motorcycle engine to which the rotational speed/tip sensor of the invention is attached.

Referring to FIG. 1, a rotational speed/tip sensor 1 is illustrated that includes the present invention. The rotational speed/tip sensor 1 is particularly useful in conjunction with a motorcycle having an engine generally represented at reference numeral 3. However, it will be understood that the invention is not limited to use in two-wheeled motor vehicle applications.

The particular motorcycle engine 3 shown has a hollow gear cover 5 inside of which rotates a gear cup 7. The gear cup 7 has a tubular wall 9 with a pair of cutouts 11. The gear cup rotates at a speed that is proportional to the speed of the engine. A timing plate 13 is located inside and is attached to the gear cover 5. A suitable cover and gasket 15 close the gear cover.

In accordance with the present invention, the rotational speed/tip sensor 1 combines the functions of simultaneously detecting the attitude of the motorcycle relative to a selected frame of reference and the speed of the motorcycle engine 3 in one small package. Looking also at FIGS. 2 and 3, the attitude of the motorcycle relative to the selected frame of reference is detected by a tip sensor 16 that is assembled in a housing 17. The engine speed is detected by a speed sensor 18 that is assembled in the same housing 17. The housing is mounted to the timing plate 13 such that the rotational speed/tip sensor occupies a minimum of space.

HOUSING

The housing 17 of the rotational speed/tip sensor 1 is fabricated with an irregularly shaped peripheral wall 19. Sides 21, 23, and 25 of the peripheral wall 19 cooperate with a middle wall 27 to form a first chamber 29. Sides 31, 33, 35, and 37 of the peripheral wall cooperate with the middle wall 27 to form a second chamber 39. There is an opening 40 in the middle wall. A top flange 41 extends around the peripheral wall.

The timing plate 13 has a large opening 43 in it. A bottom wall 45 of the first chamber 29 of the housing 17 and a bottom wall 47 of the housing second chamber 39 extend through the timing plate opening 43. The housing is mounted to the timing plate by capturing the timing plate between the housing top flange 41 and a similar bottom flange 49.

The bottom wall 47 of the housing second chamber 39 is formed with an inner recess 51 and with an outer recess 53. Upstanding from the bottom wall of the second chamber are a pair of bosses 55, each having a guide pin 57.

TIP SENSOR

Turning to FIGS. 4–9, the tip sensor 16 will be described. The tip sensor is comprised of six components: a case 59, V-block 61, cap 63, sensing device 65, disk 67, and plug 69. The case 59, V-block 61, cap 63, disk 67, and plug 69 are assemblable into a compact module 71 as shown in FIGS. 8 and 9.

The case 59 is fabricated from a non-ferrous material and has a back wall 73, a front wall 75, and a three-sided peripheral wall. The peripheral wall has a top section 77, a bottom section 79, and an end section 81. The end section 81 of the peripheral wall may have an angular portion 83. The case end 85 opposite the peripheral wall end section 81 is open. The case front wall 75 defines a shallow pocket 87. The depth of the pocket 87 is slightly greater than the thickness of the sensing device 65.

The V-block 61 is made from a non-ferrous material. It has a side wall 89 that defines a centerline 91. A pair of ramp walls 93, 95 are perpendicular to the side wall 89. The ramp walls 93, 95 converge symmetrically about the centerline 91 toward the bottom of the side wall to form an apex 97. The angle A of each ramp wall with the centerline 91 is governed by the particular motorcycle with which the rotational speed/tip sensor 1 is to be used. The angular portion 83 of the peripheral wall of the case 59 matches the angle A of the ramp wall 93. A top wall 99 is also perpendicular to the side wall. The free ends 101 of the ramp walls are spaced from the top wall 99. The width of the top wall is slightly less than the distance between the front and back walls 75 and 73, respectively, of the case. The ramp walls have a lesser width than the top wall.

Depending from the top wall 99 of the V-block 61 is a bumper 103. The bumper 103 is partially defined by surfaces 105 that are parallel to the ramp walls 93, 95. The surfaces 105 converge to a point 107 that lies on the centerline 91. The ramp walls and the bumper thus cooperate to form a two dimensional V-groove having straight sides and the apex 97. The bumper has a cutout 109 adjacent the top wall.

The V-block side wall 89 has an area 111 that is outside of the V-groove. A spacer 113 having the same width as the top wall 99 extends from the area 111.

The cap 63 is made from a non-ferrous material and has an end plate 115 with a hole 117 therethrough. A flange 119 on the cap end plate 115 fits inside the open end 85 of the case 59. The plug 69 seals the cap hole 117. The plug is located near the area 111 of the V-block side wall 89. As illustrated, the plug is made from molded rubber. However, it will be appreciated that any of several types of plugs, such as a screw with a sealing washer, also would be satisfactory.

In the preferred embodiment, the sensing device 65 is a Hall Effect sensing device. The Hall Effect sensing device has a target point 123 and three wires collectively represented at reference numeral 146.

The disk 67 is a magnet having a cylindrical shape. The disk is sized to fit loosely within the V-groove between the V-block ramp walls 93, 95 and the bumper surfaces 105.

The tip sensor module 71 is assembled by placing the disk 67 on the V-block side wall 89 proximate the apex 97. Then the V-block 61 is slid inside the open end 85 of the case 59. The V-block and case are designed such that the V-block can have only one orientation to properly seat inside the case. As mentioned, the width of the V-block ramp walls 93, 95 and of the bumper 103 is less than the distance between the case back and front walls 73 and 75, respectively. Accordingly, there is a space 125 between the longitudinal edges 127 of the ramp walls and the case front wall. The space 125 also exists between the bumper and the case front wall. The flange 119 of the cap 63 is inserted into the case open end, and the cap is resistance welded to the case. The disk is thus loosely captured for rolling in two dimensions within the V-groove.

The interior of the case 59 may be partially filled with a silicone oil. In some applications, an oil may not be necessary or desirable. The oil viscosity is tuned to minimize random bouncing of the disk 67 inside the V-groove while still allowing desired rolling of the disk along the ramp walls 93, 95, as will be explained shortly.

The case 59 is not completely filled with the silicone oil. Rather, an air space represented by two typical air bubbles 129, 131 remains inside the case. The plug 69 is inserted into the cap 63 after the correct amount of oil is in the case.

Figure 2:
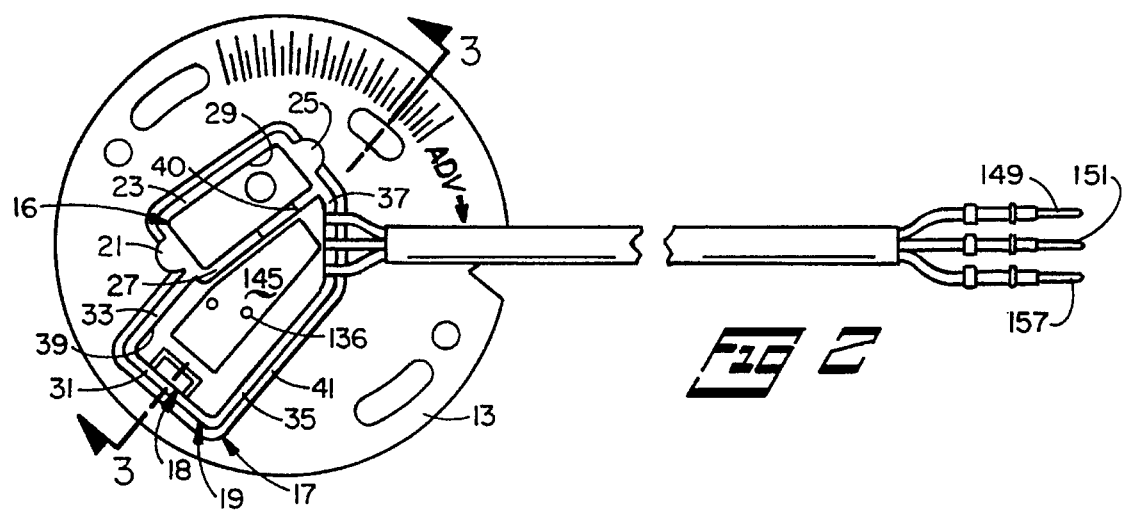
FIG. 2 is a front view of the rotational speed/tip sensor of the invention.
Figure 3:
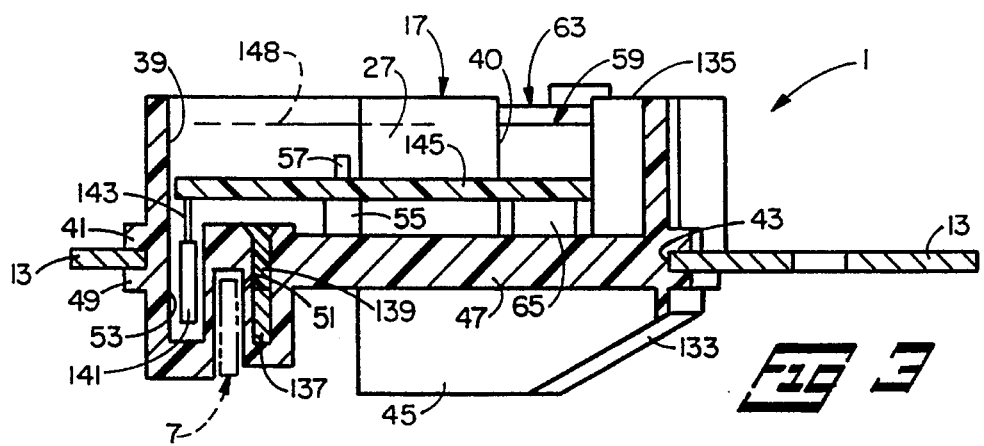
FIG. 3 is a cross sectional view on an enlarged scale taken along line 3—3 of FIG. 2.

The module 71 of the tip sensor 16 is inserted into the first chamber 29 of the housing 17, FIGS. 2 and 3. The angular portion 83 of the case 59 fits against a similarly angled portion 133 of the bottom wall 45 of the first chamber. The cap 63 is below the top edge 135 of the housing.

The sensing device 65 of the tip sensor 16 is wired to a circuit board 145 by the wires 146. The circuit board 145 has two small holes 136 therein. The circuit board is assembled in the housing 17 by registering the holes 136 with the guide pins 57 in the housing second chamber 39 and resting the circuit board on the bosses 55. The sensing device 65 is wired to the circuit board such that when the circuit board is assembled in the housing, the sensing device extends through the opening 40 in the housing middle wall 27 and is located adjacent the pocket 87 in the case 59.

It is a feature of the present invention that the target point 123 of the Hall Effect sensing device 65 does not coincide with the longitudinal axis 124 of the disk 67 when the disk is within the V-groove apex 97. Rather, the sensing device target point is located toward the bumper point 107 such that the target point intersects the disk for all positions of the disk longitudinal axis 124 along the centerline 91 between the apex and the bumper point. For example, if the disk is at the position 67A in FIG. 8, the target point still intersects the disk. Further, the target point intersects the disk for multiple disk positions, typically represented by reference numeral 67B, along the ramp walls 93, 95.

SPEED SENSOR

Returning to FIGS. 1–3, the speed sensor 18 is comprised of a magnet 137 that is installed in the inside recess 51 of the housing second chamber 39. The magnet 137 is retained in the inside recess by a plug 139.

The speed sensor 18 further comprises a Hall Effect sensing device 141. The Hall Effect sensing device 141 is connected by three wires collectively represented at reference numeral 143 to the circuit board 145. Connection of the sensing device 141 to the circuit board is such that the sensing device is located in the outside recess 53 of the housing second chamber 39 when the circuit board is assembled in the housing second chamber.

When the rotational speed/tip sensor 1 is attached to the motorcycle gear cover 5, the recesses 51 and 53 of the housing 17 straddle the tubular wall 9 of the gear cup 7. Consequently, the speed sensor sensing device 141 detects the absence or presence of the portions of the gear cup wall between the cutouts 11.

When the tip sensor 16, speed sensor 18, and circuit board 145 are all assembled in the housing 17, the housing second chamber 39 is filled with a potting compound to about the level indicated by phantom line 148 in FIG. 3. The potting compound encapsulates the tip and speed sensors and the circuit board in the housing, thereby holding them in place and protecting them from damage.

CONTROL

Figure 10:
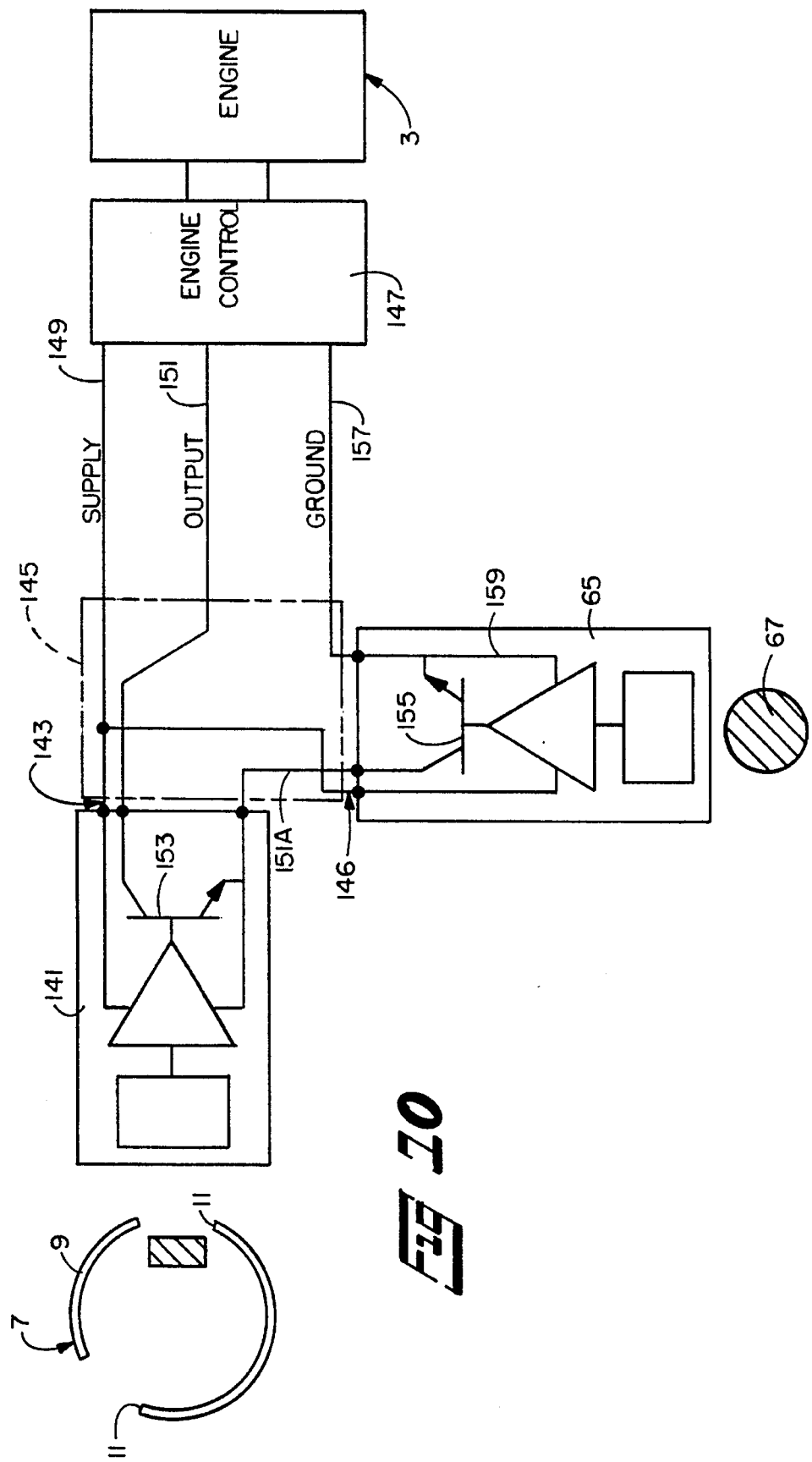
FIG. 10 is an electrical schematic of the tip sensor and the speed sensor of the invention.

It is a feature of the present invention that only three wires are needed to operate both the sensing device 65 of the tip sensor 16 and the sensing device 141 of the speed sensor 18. FIG. 10 shows a schematic electrical diagram of the two sensing devices in combination with the engine 3 and the engine control generally represented by block 147.

A power supply wire 149 provides electrical voltage to both the sensing devices 65 and 141 from the engine control 147. A signal output wire 151 from the engine control connects to the plate 153 of the speed sensor sensing device 141. Another signal output wire 151A connects the plate 153 to the plate 155 of the tip sensor sensing device 65. The output of the plate 155 is connected to a ground wire 157. In that manner, the plates 153 and 155 of the two sensing devices are connected electrically in series. To enable only the three wires 149, 151, and 157 to handle both sensing devices, the ground 159 of the amplifier of the tip sensor sensing device is common with the ground wire 157.

OPERATION

In normal operation, the motorcycle is in an upright attitude relative to gravity. In that situation, the tip sensor 16 is in the attitude of FIG. 8. The tip sensor sensing device 65 detects the presence of the disk 67 and enables the signal output circuit 151, 153, 151A, 155, 157 to close and the speed sensor 18 to function. The engine 3 is then able to operate in a normal manner. The silicone oil damping fluid, the bumper point 107 of the V-block 61, and the tip sensing device target point 123 cooperate to assure that any transient vibrations of the motorcycle do not cause the disk to unintentionally move within V-groove so as not to be detected by the sensing device 65.

However, if forces acting on the disk 67 are such that the resultant of forces acting on the disk cause it to move to the position of FIG. 11, the tip sensor 16 detects such tipping. In FIG. 11, the disk 67 has rolled out of the apex 97 of the V-groove. The sensing device 65 detects the absence of the disk and switches state to open the circuit 151, 153, 151A, 155, 157. As a result, the speed sensor sensing device 141 becomes inoperative, and the motorcycle engine 3 is shut down.

When the motorcycle tips as shown in FIG. 11, the disk 67 rolls along the V-groove until it strikes the end section 81 of the case peripheral wall. If the motorcycle tips in the opposite direction from that of FIG. 11, the disk rolls along the ramp wall 95 until it strikes the cap 63. Using the case end section 81 and the cap 63 as the limits for the rolling disk enables a maximum amount of disk movement within the V-groove. The location of the cap plug 69 in the region of the area 111 of the V-block side wall 89 precludes the possibility that the plug will interfere with the rolling of the disk.

As the tip sensor 16 undergoes tipping, the damping oil flows through a labyrinth composed of the space 125 between the V-block ramp walls 93, 95 and the case front wall 75, of the space between the bumper 103 and the case front wall, and of the cutout 109 in the bumper. The labyrinth enables the fluid to start flowing as soon as the motorcycle undergoes its tipping motion. Simultaneously, the air bubbles 129, 131 change their positions within the case 59. The bubble 129 flows through the cutout 109 in the bumper 103. The bubbles flow from against the V-block top wall 99 to become merged against the cap 63 as shown at reference numeral 129'. The air bubbles create a flushing action of the silicone oil that enhances the oil flow through the labyrinth and thus enhances the rolling of the disk 67.

When the motorcycle undergoes a reverse tipping motion such that it returns to the upright attitude of FIG. 8, the disk 67 rolls back to the V-groove apex 97. Upon that occurrence, the tip sensor sensing device target point 123 again intersects the disk and closes the circuit 151, 153, 151A, 155, 157.

A motorcycle occasionally rounds a corner. When that occurs, normal acceleration force acting on the motorcycle and tip sensor 16 becomes larger than the contribution of force due to gravity. That situation is represented by the position of the disk 67C in FIG. 11. Inertia of the disk keeps it within the V-groove apex 97 despite the tipping of the motorcycle and the tip sensor relative to the vertical.

In summary, the results and advantages of motorcycles can now can be more fully realized. The rotational speed/tip sensor 1 provides both a tip sensing feature and an engine operational feature in a single compact package. This desirable result comes from using the combined functions of the tip sensor 16 and the speed sensor 18. The tip sensor automatically detects the attitude of the motorcycle relative to both gravitational and inertial frames of reference. As long as the motorcycle is upright or is rounding a corner, the tip sensor allows normal operation of the engine. However, if the motorcycle tips over when idle or when traveling in a straight line, the tip sensor operates to signal the speed sensor to shut down the engine.

It will also be recognized that in addition to the superior performance of the rotational speed/tip sensor 1, its design and construction are such that it is rugged and reliable. Therefore, its need for maintenance is negligible.

Thus, it is apparent that there has been provided, in accordance with the invention, a rotational speed/tip sensor that fully satisfies the aims and advantages set forth above. While the invention has been described in conjunction with specific embodiments thereof, it is evident that many alternatives, modifications, and variations as to sizes, shapes, and materials will be apparent to those skilled in the art in light of the foregoing description. Accordingly, it is intended to embrace all such alternatives, modifications, and variations as fall within the spirit and broad scope of the appended claims.

We claim:

1. In a two-wheeled motor vehicle having an engine, sensor means for simultaneously detecting the attitude of the motor vehicle relative to a selected frame of reference and the speed of the engine comprising:

a. housing means for attaching to the engine;

b. tip sensor means assembled in the housing means for detecting the attitude of the vehicle relative to the selected frame of reference;

c. speed sensor means assembled in the housing means for detecting the speed of the engine; and d. control means for controlling the engine in response to the attitude of the motor vehicle relative to the selected frame of reference as detected by the tip sensor means.

2. The sensor means of claim 1 wherein the housing means comprises;

a. a plate attached to the engine; and b. a housing mounted on the plate, the housing having a first chamber that receives the tip sensor means and a second chamber that receives the speed sensor means.

3. The sensor means of claim 2 wherein the control means comprises:

a. an engine control;

b. an electrical circuit board assembled in the housing second chamber and connected electrically to both the tip sensor means and the speed sensor means; and c. one each of a power supply, signal output, and ground wire connected between the engine control and the electrical circuit board.

4. The sensor means of claim 2 wherein the tip sensor means comprises:

a. a case with a cap assembled in the housing first chamber;

b. a V-block inside the case and cap and cooperating therewith to form a two dimensional V-groove having straight sides that converge about a centerline to form an apex, the V-groove centerline being substantially vertical when the motor vehicle is in an upright attitude;

c. disk means for rolling inside the V-groove;

d. fluid means inside the case and cap for damping spurious vibrations on the disk means; and e. a tip sensing device adjacent the case that detects the absence or presence of the disk means in the V-groove apex, so that the disk means is in the V-groove apex and the tip sensing device detects the presence of the disk means when the motor vehicle is in an upright attitude, and the disk means rolls out of the V-groove apex and the tip sensing device detects the absence of the disk means when the motor vehicle tips through a predetermined angle relative to the vertical.

5. The sensor means of claim 4 wherein the case and V-block cooperate to form a labyrinth through which the fluid means flows to enhance flowing of the fluid means and rolling of the disk means when the motor vehicle tips through the predetermined angle.

6. The sensor means of claim 4 wherein:

a. the case has a wall that defines a pocket proximate the V-groove apex;

b. the tip sensing device is located adjacent the case pocket to place the tip sensing device at a location close to the V-groove apex.

7. The sensor means of claim 4 wherein:

a. the housing second chamber is formed with a recess;

b. a middle wall separates the housing first and second chambers, the middle wall having an opening therethrough;

c. the control means comprises a circuit board assembled in the housing second chamber;

d. the speed sensor means comprises a speed sensing device connected to the circuit board and located in the recess in the housing second chamber; and e. the tip sensing device is connected to the circuit board and extends through the opening in the housing middle wall to be adjacent the tip sensor means case.

8. The sensor means of claim 7 wherein:

a. the tip sensing device and the speed sensing device are connected electrically in series; and b. the speed sensing device actuates to shut off the engine when the tip sensing device detects the absence of the disk means from the V-groove apex.

9. A rotational speed/tip sensor for controlling the engine of a two-wheeled motor vehicle comprising:

a. first sensor means for detecting the attitude of the two-wheeled motor vehicle relative to vertical;

b. second sensor means for detecting the engine speed;

c. housing means mounted to the engine for receiving the first and second sensor means; and d. control means for shutting down the engine in response to the first sensor means detecting a predetermined attitude of the two-wheeled motor vehicle relative to the vertical.

10. The rotational speed/tip sensor of claim 9 wherein:

a. the housing means comprises a housing formed with first and second chambers;

b. the first sensor means is received in the housing first chamber;

c. the second sensor means is received in the housing second chamber; and d. the control means comprises a circuit board assembled in the housing second chamber and connected electrically to the first and second sensor means.

11. The rotational speed/tip sensor of claim 10 wherein the first sensor means comprises:

a. a case with a cap assembled in the housing first chamber;

b. a V-block inside the case and cap and cooperating therewith to form a two dimensional V-groove having straight sides that converge about a centerline to form an apex, the V-groove centerline being substantially vertical when the two-wheeled motor vehicle is in an upright attitude relative to a gravity frame of reference;

c. a disk in the V-groove, the disk being in the V-groove apex when the two-wheeled motor vehicle is upright, the disk rolling out of the V-groove apex when the two-wheeled motor vehicle tips through an angle to the predetermined attitude relative to the vertical;

d. fluid means inside the case and cap for damping spurious vibrations on the disk; and e. a tip sensing device connected to the circuit board and located adjacent the case, the tip sensing device detecting the presence of the disk when the two-wheeled motor vehicle is in an upright attitude relative to the vertical, and the tip sensing device detecting the absence of the disk when the two-wheeled motor vehicle tips to the predetermined attitude relative to the vertical.

12. The rotational speed/tip sensor of claim 11 wherein:

a. the tip sensing device has power supply, signal output, and ground wires connected to the circuit board;

b. the speed sensor means comprises a speed sensing device having power supply, signal output, and ground wires connected to the circuit board in common with the power supply, signal output, and ground wires, respectively, of the tip sensing device.

13. The rotational speed/tip sensor of claim 11 wherein:

a. the housing means comprises a middle wall that separates the first and second chambers, the middle wall having an opening therethrough;

b. the case of the tip sensor means defines a pocket that is adjacent the opening in the housing middle wall; and c. the tip sensing device extends through the opening in the housing middle wall and is adjacent the pocket in the tip sensor means case.

14. The rotational speed/tip sensor of claim 12 wherein the tip sensing device and the speed sensing device are connected electrically in series, the tip sensing device operating to actuate the speed sensing device to shut down the engine when the tip sensing device detects the absence of the disk from the V-groove apex.

15. A method of controlling the engine of a two-wheeled motor vehicle comprising the steps of:

a. mounting a housing to the two-wheeled motor vehicle engine;

b. assembling a tip sensor in the housing;

c. assembling a speed sensor in the housing;

d. operating the tip sensor to close an electrical circuit through the speed sensor and enabling running of the engine in response to the two-wheeled motor vehicle being in a first attitude relative to a selected frame of reference; and e. operating the tip sensor to open the electrical circuit through the speed sensor and shutting down the engine in response to the two-wheeled motor vehicle being in a second attitude relative to the selected frame of reference.

16. The method of claim 15 wherein the steps of assembling a tip sensor and a speed sensor in the housing comprise the step of assembling the tip sensor and the speed sensor electrically in series.

17. The method of claim 16 wherein the steps of assembling the tip sensor and the speed sensor electrically in series comprise the step of assembling the tip sensor and the speed sensor electrically in series using common power supply, signal output, and ground wires.

18. The method of claim 15 wherein the steps of assembling a tip sensor and a speed sensor in the housing comprise the steps of:

a. connecting a tip sensing device and a speed sensing device to a circuit board;

b. locating the tip sensing device in a first chamber of the housing;

c. locating the speed sensing device in a second chamber of the housing; and d. assembling the circuit board in the housing second chamber.

* * * * *